United States Patent [19]

Wang

[11] 4,107,278
[45] Aug. 15, 1978

[54] PROCESS FOR MAKING HCN

[75] Inventor: Victor Kai-Kuo Wang, Wilmington, Del.

[73] Assignee: E. I. Du Pont de Nemours and Company, Wilmington, Del.

[21] Appl. No.: 714,353

[22] Filed: Aug. 16, 1976

[51] Int. Cl.$^2$ ............................................. C01C 3/02
[52] U.S. Cl. .................................................. 423/376
[58] Field of Search ............... 423/372, 376, 415 A; 252/411 R, 416

[56] References Cited

U.S. PATENT DOCUMENTS

| | | | |
|---|---|---|---|
| 1,957,749 | 5/1934 | Andrussow et al. | 423/376 |
| 2,478,875 | 8/1949 | Merill et al. | 423/376 |
| 2,800,402 | 7/1957 | Ludeman | 423/415 A |
| 2,920,940 | 1/1960 | Kronacher | 423/376 |
| 3,033,658 | 5/1962 | Gross | 423/376 |
| 3,254,110 | 5/1966 | Sennewald | 260/465.3 |

OTHER PUBLICATIONS

Mellor, Treatise on Inorganic and Theoretical Chemistry, vol. 5, Longmans, Green, N. Y., (1924), pp. 817, 818.

*Primary Examiner*—Brian Hearn

[57] ABSTRACT

In an Andrussow-type process for making HCN from methane and ammonia, activity of the catalyst is improved by adding $CO_2$ to the reactants.

5 Claims, No Drawings

PROCESS FOR MAKING HCN

BACKGROUND OF THE INVENTION

The invention relates to an improvement in the Andrussow process for making HCN. In particular, the invention relates to improvement of the efficiency of the process.

Hydrogen cyanide (HCN) is one of the smaller volume industrial chemicals, which nevertheless is quite important in the chemical industry. In particular, HCN is used for the manufacture of cyanuric chloride, methyl methacrylate, adiponitrile (for nylon-6,6), sodium cyanide, ferrocyanides and chelating agents.

At present, almost all of the world's production of HCN is made by one of three processes:

(1) The Andrussow process in which ammonia, methane and oxygen are reacted over an oxidation catalyst to form HCN, CO, water and $H_2$;

(2) The "methane-ammonia direct process" or Degussa process in which ammonia and methane are reacted in the absence of air in externally heated tubes containing platinum/rhodium catalyst to form HCN and hydrogen; and (3) The Shawinigan process in which ammonia and propane are passed between spaced electrodes within a fluidized bed of coke. In addition to the above processes for making HCN directly, it is also made as a byproduct in the manufacture of acrylonitrile by reaction of propylene and ammonia over an oxidation catalyst.

Though each of these processes is used commercially, by far the most widely used is the Andrussow process. In the Andrussow process, a vapor phase mixture of oxygen-containing gas (usually air), ammonia ($NH_3$) and methane is contacted with platinum metal catalyst at a temperature of about 1200° C by which part of the methane is burned to furnish heat to the methane-ammonia reaction, which is endothermic. The overall reaction of the process is as follows:

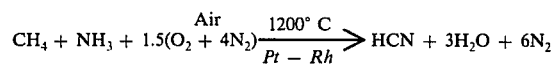

$$CH_4 + NH_3 + 1.5(O_2 + 4N_2) \xrightarrow[Pt-Rh]{Air \quad 1200°\,C} HCN + 3H_2O + 6N_2$$

Other byproducts of the reaction are $H_2$, CO, $CO_2$ and $N_2$.

One characteristic of the Andrussow process is that the catalyst becomes less active with use. Though the cause for such deactivation is not precisely known, it is believed to be in part due to the formation of carbon on the catalyst, which results in a blocking of part of the active sites on the catalyst surface with a thin layer of carbon. In order to avoid this, it has heretofore been necessary to operate with lower concentrations of $CH_4$ in the reactant feed to the process. Consequently, efficiency of $CH_4$ utilization is lowered.

Because of the substantially higher cost of natural gas, which is the primary source of methane, and the shortage of natural gas, especially during periods of high residential use for heating, it is essential that available methane sources be utilized in the most effective manner.

BRIEF DESCRIPTION OF THE INVENTION

It has now been discovered that, in an Andrussow-type process for the synthesis of HCN by the vapor-phase reaction of ammonia, methane and oxygen in the presence of an oxidation catalyst, the effective yield of HCN can be increased by the addition of minor amounts of carbon dioxide gas ($CO_2$) to the reactants during operation of the process.

DISCUSSION OF THE PRIOR ART

Considerable work has been devoted to the supplementation of HCN process feeds. For example, in U.S. Pat. No. 2,006,981, Andrussow discloses the replacement of part of the hydrocarbon feed to the process by oxygenated hydrocarbon derivatives such as methanol, and in Italian Pat. No. 845,992, assigned to Montecatini Edison, S.p.A., the supplementation of methane with acetonitrile is disclosed. Each of these supplemental feeds is also disclosed by the same references to be capable of functioning as a primary feed for the manufacture of HCN as well.

Furthermore, inert diluent materials have also been added to the reactants in various processes for making HCN. For example, in U.S. Pat. NO. 2,688,531, Eck mentions the addition of nitrogen to the reactants in a non-catalytic process for making HCN by reaction of $CH_4$ with $NH_3$ at above 1425° C. Similarly, Bellringer et al in U.S. Pat. Nos. 2,746,843 and 3,149,914 disclose the addition of steam or nitrogen in the reaction of methanol with $NH_3$ and $O_2$ over antimony-tin catalyst to make HCN. In the reaction of $CH_4$ with $NH_3$ and $O_2$ over a platinum group metal catalyst, Gross et al in U.S. Pat. No. 3,033,658 indicates that it is preferred to dilute the reactants with inert gases such as $N_2$ to reduce reaction temperature. On the other hand, Sennewald et al in U.S. Pat. No. 3,254,110 give no reason for their indicated preference for diluting their reactants with steam, $CO_2$ or $N_2$ when making HCN by reaction of propylene with $NH_3$ and $O_2$ over molybdenum or phosphomolybdate catalyst at 300°–405° C. Likewise, Brown et al in U.S. Pat. No. 3,577,218 do not elaborate on their preference for adding $N_2$ as a diluent for an HCN process in which $NH_3$ and $CH_4$ are reacted in the absence of air over a platinum-on-alumina catalyst at 1000° C. However, in U.S. Pat. No. 3,667,907, Rushmere adds steam to the reactants for the express purpose of improving $NH_3$ conversion in the Andrussow process. Of related interest is German Pat. No. 2,421,166 which discloses using $CO_2$ in the absence of reactants to reduce the carbon buildup in the catalyst tubes of an ammonia-methane direct process and thus reduce pressure drop when the process is in operation.

DETAILED DESCRIPTION OF THE INVENTION

In the Andrussow process for making HCN, a mixture of ammonia, methane and oxygen-containing gas is fed to a reactor containing a fixed bed of platinum metal catalyst. Because the process is endothermic, it is necessary to provide methane in sufficient excess of the stoichiometric amount required to form the HCN to maintain the reaction temperature at 1000°–1200° C. The reaction gases contain mostly HCN, $N_2$, CO, $H_2$, $H_2O$, $NH_3$ and small amounts of $CH_4$, $CO_2$ and, if air is used as the oxygen-containing gas, argon. In many commercial operations, the hot reaction gases are used to generate steam and the heating values are otherwise recovered. Upon cooling to about 75° C, the reaction gases are passed through an absorber in which the $NH_3$ is removed by absorption into an aqueous solution of monoammonium phosphate to form diammonium phosphate. The diammonium phosphate is then steam stripped to separate the ammonia, which is recycled to the process, and thus monoammonium phosphate is regenerated and recycled to the cold off gas absorber. The ammonia-free reactor off gas is passed to a cold water absorber in which the HCN is removed and the HCN-free off gas, which has a heating value of about 90 BTU, is used as fuel.

The Andrussow process is generally run at a catalyst temperature of from about 1000° to 1200° C and preferably within the range of 1100° to 1200° C. The proportions of the reactants — $CH_4$, $NH_3$ and $O_2$ — will ordinarily be as near stoichiometric as possible consistent with safety, the amount of $O_2$ and $CH_4$ being, of course, sufficient to provide the necessary reaction temperature. Excess quantities of $NH_3$ act mainly as a diluent and pass through the reaction system unconverted. Because of the substantial cost of treating the reaction mixture to separate the HCN product and to remove such unconverted materials, it is, of course, preferred to minimize the leakage of both unconverted $NH_3$ and unconverted $CH_4$ through the system.

To obtain benefit from the addition of $CO_2$ to the reactants, it is necessary to control the amount of $CO_2$ addition with respect to both the ratio of $CH_4$ to $O_2$ and the percentage (by volume) of $CO_2$ in the feed gases. In particular, it has been found that $CO_2$ is effective to obtain higher conversion of both $CH_4$ and $NH_3$ to HCN at $CH_4/O_2$ ratios (by volume) of from about 0.9 to about 1.5. Furthermore, even higher increases in conversion are obtained within the range of from about 1.0 to about 1.3. Oxygen for the reaction may, with due regard for safety considerations, be provided by means of oxygen-containing gases ranging from essentially pure $O_2$ to more dilute oxygen-containing gas streams such as air, which is most commonly used. However, oxygen-containing gases containing lower concentrations of $O_2$ become less economical because they require larger sized equipment to handle the concommittently higher amounts of inert diluent.

It has also been found at least about 0.5% by volume (basis total feed gases) $CO_2$ must be contained in the reactants passing to the catalyst in order to obtain 1% additional conversion of either $CH_4$, $NH_3$ or both. However, it appears that no additional benefit is obtained beyond about 20% and, indeed, there is evidence that the use of more than about 10% $CO_2$ may be slightly less effective even when the catalyst temperature is kept constant. A $CO_2$ content in the feed gases of 2 to 10% appears to be optimum.

The source of $CO_2$ feed is not critical to the operation of the process. However, when equipment size is limiting, it will be preferred to minimize the amount of diluent in the $CO_2$, usually $N_2$. On the other hand, if gas handling capacity is adequate, it may be feasible to use fairly dilute sources of $CO_2$ such as flue gas and inert gas produced by hydrocarbon-burning inert gas generators and the like.

The pressure of the process is not critical and it may be carried out at either increased or reduced pressure in accordance with the engineering economics of the particular plant being considered. Most Andrussow-type operations are conducted at slightly above atmospheric pressure, e.g., 5-10 psig.

Quite a large variety of oxidative catalytic materials may be used in the practice of the Andrussow process as is indicated in his basic patent, U.S. Pat. No. 1,934,838. By far the most widely used catalysts for this process are the noble metal catalysts, including platinum, iridium, rhodium, palladium, osmium, gold and silver and alloys thereof. However, oxide catalysts have also been used such as $Fe_2O_3/Bi_2O_3/MoO_3/P_2O_5/SiOhd 2$ which is disclosed in U.S. Pat. No. 3,516,789 to Sennewald, mixed antimony and stannic oxides which are taught by Bellringer in U.S. Pat. No. 3,149,914, molybdenum oxide as described in U.S. Pat. No. 2,746,843 and the rear earth metals which are also referred to in the above-cited patent to Andrussow. In U.S. Pat. No. 3,254,110, Sennewald discloses that combinations of transition metal oxides with molybdenum oxide are good catalysts for preparing nitriles. However, of all these, platinum/rhodium is used most extensively.

Though there appears to be no reason why the invention would not be operable in other than fixed bed operation, nevertheless, the Andrussow process is normally carried out over a fixed bed of the catalyst in foraminous form such as pellets, spheres, chips, net, screen or gauze. When in particulate form, the catalyst will usually be supported on an inert carrier having an average dimension of 1/16 to ⅜ inch. The catalyst is quite often in the form of several layers of fine mesh gauze through which the reactant gases are passed downwardly.

Though not essential to obtaining the benefits of the invention, the economics of the process of the invention are improved when heat recovery for the reaction is maximized, e.g., by use of the reactor modifications described and claimed in U.S. Pat. No. 2,782,107 to Inman and U.S. Pat. No. 3,215,495 to Jenks.

The advantages of the invention are illustrated by the examples which are set out hereinbelow.

EXPERIMENTAL APPARATUS

The experimental results disclosed in the Examples were obtained in a laboratory-scale reactor unit in which the reactants were passed on a single-pass, once-through basis through a bed of platinum rhodium catalyst.

Three pressurized gas cylinders containing methane, ammonia and air respectively are hooked up in parallel. The discharge line in each cylinder has its own flow measurement and manual control means by which the relative proportions of gas flow for each cylinder can be controlled. Each of the reactant lines discharges into a manifold line which communicates with a mixing and vaporizing chamber filled with glass beads. The mixture of reactant gases from the mixing chamber is then passed through a filter and flame arrester to an electrically heated integral preheater/reactor. The preheater/reactor is a continuous quartz tube, the upstream (preheater) end of which is 1 inch in diameter and is filled with glass beads. The preheater section is enclosed within an electric heater by which the reactants can be heated to the desired temperature before entering the reactor. The reactor section is ⅜ inch internal diameter and contains a bed of platinum/rhodium chips in which the weight proportions of platinum and rhodium are 90/10. Reaction gases are discharged through a second flame arrester into a burner in which they are incinerated and discharged from the system. The process unit contains sampling ducts both upstream and downstream of the preheater/reactor by which gas samples are conducted to a gas chromatograph for analysis. The unit is also equipped with suitable pressure and temperature indication means. In addition, the outlet of each of the reactant gas cylinders is hooked up to a nitrogen cylinder so that any part of the process unit can be readily purged.

Definitions $$CH_4 \text{ Selectivity} = \frac{\% \text{ vol. HCN in product}}{(\% \text{ vol. } CH_4 \text{ in feed}) - (\% \text{ vol. } CH_4 \text{ in product})}$$

$$NH_3 \text{ Selectivity} = \frac{\% \text{ vol. HCN in product}}{(\% \text{ vol. } NH_3 \text{ in feed}) - (\% \text{ vol. } NH_3 \text{ in product})}$$

$$CH_4 \text{ Conversion} = \frac{\% \text{ vol. HCN in product}}{\% \text{ vol. } CH_4 \text{ in feed}}$$

$$NH_3 \text{ Conversion} = \frac{\% \text{ vol. HCN in product}}{\% \text{ vol. } NH_3 \text{ in feed}}$$

EXAMPLE I

A reactant mixture consisting of methane, air and ammonia in which the ratio of $CH_4$ to air was 0.18 and the ratio of $NH_3$ to air was 0.24 was passed at a rate of 2000 cc/minute for about one hour through the test apparatus described above. The catalyst temperature was about 1050° C. Analysis of the feed and product gases indicated the following:

Conversion of $CH_4$ to HCN: 43
Conversion of $NH_3$ to HCN: 31
Selectivity of $CH_4$ to HCN: 48
Selectivity of $NH_3$ to NCN: 40

EXAMPLE II

The experiment of Example I was repeated under precisely the same conditions except that 2.8% volume of the reactant mixture was replaced with gaseous $CO_2$. Analysis of the feed and product gases indicated the following:

Conversion of $Ch_4$ to HCN: 56
Conversion of $NH_3$ to HCN: 43
Selectivity of $CH_4$ to HCN: 63
Selectivity of $NH_3$ to HCN: 52

Comparison of the data for this example with the data from Example I shows that under isothermal reaction conditions, the conversion of $CH_4$ to HCN was increased by 30.2% and conversion of $NH_3$ was increased by 38.7%. Similarly, $CH_4$ selectivity rose by 31.2% and $NH_3$ selectivity by 30.0%. It was noted in both examples that the volume of $CO_2$ in the reactor off gases was substantially the same as in the feed gases, indicating that essentially none of the $CO_2$ was consumed during the course of the reaction even though it did profoundly affect the conversions and selectivities of the process.

EXAMPLE III

Using the same procedure and apparatus as in the previous examples, a series of 9 experimental runs was made in which methane was reacted with ammonia and air in the absence of $CO_2$ and then a series of 9 runs was made in which from about 4.5 to about 6.0% $CO_2$ was contained in the feed to the reactor. Within both series the $CH_4$/air ratio was varied between about 0.18 and 0.32 and the $NH_3$/air ratio was varied between about 0.18 and 0.33. As in the previous examples, the feed and products for each of the runs were analyzed and compared. The results are given in the following table:

TABLE 1

EFFECT OF $CO_2$ ADDITION UPON CONVERSION OF $CH_4$ TO HCN
Catalyst: 0.3524 g Pt-Rh at 1160° C

| Run No. | 1 | 2 | 3 | 4 | 5 | 6 | 7 | 8 | 9 |
|---|---|---|---|---|---|---|---|---|---|
| $CO_2$ in Feed, % vol | None | None | None | None | None | None | None | None | None |
| $NH_3$/Air | 0.180 | 0.206 | 0.220 | 0.343 | 0.269 | 0.275 | 0.283 | 0.314 | 0.328 |
| $CH_4$/Air | 0.182 | 0.187 | 0.195 | 0.205 | 0.224 | 0.227 | 0.252 | 0.285 | 0.320 |
| Conversion of $CH_4$ to HCN, % vol | 20 | 24 | 29 | 21 | 22 | 30 | 32 | 30 | 23 |

| Run No. | 10 | 11 | 12 | 13 | 14 | 15 | 16 | 17 | 18 |
|---|---|---|---|---|---|---|---|---|---|
| $CO_2$ in Feed, % vol | 5.8 | 5.3 | 5.8 | 6.0 | 4.5 | 4.5 | 5.4 | 4.9 | 5.9 |
| $NH_3$/Air | 0.189 | 0.208 | 0.235 | 0.263 | 0.249 | 0.267 | 0.290 | 0.305 | 0.331 |
| $CH_4$/Air | 0.187 | 0.198 | 0.206 | 0.225 | 0.225 | 0.252 | 0.267 | 0.285 | 0.300 |
| Conversion of $CH_4$ to HCN, % vol | 24 | 30 | 38 | 42 | 40 | 38 | 34 | 34 | 28 |

Graphical correlation of these data show that at an approximately constant degree of $CO_2$ addition, the degree of conversion of $CH_4$ is a function of the $CH_4$/air ratio. More particularly, significant increases in $CH_4$ conversion are obtained in the range of from about 0.18 to about 0.29 $CH_4$/air and the greatest increase was observed at about 0.225 $CH_4$/air. From 0.20 to 0.26 $CH_4$/air, the increase in HCN conversion appears to be at least 6 percentage points.

EXAMPLE IV

Using the same procedure and apparatus as in the previous examples, a further series of 10 runs was made in which methane was reacted with ammonia and air in the presence of various amounts of $CO_2$ at constant ratios of both $CH_4$/air and $NH_3$/air. When the feed and product gases analyses were compared, the results were as follows:

TABLE 2

EFFECT OF $CO_2$ ADDITION UPON CONVERSION TO HCN
Catalyst: 0.3524 g Pt-Rh at 1160° C; $CH_4$/Air: 0.23; $NH_3$/Air: 0.26

| Run No. | 19 | 20 | 21 | 22 | 23 | 24 | 25 | 26 | 27 | 28 |
|---|---|---|---|---|---|---|---|---|---|---|
| $CO_2$ in Feed, % vol | 0 | 2.0 | 3.5 | 4.5 | 6.0 | 8.0 | 10.0 | 11.0 | 12.7 | 15.5 |
| Conversion of $CH_4$ to HCN, % vol | 30 | 40 | 41 | 42 | 41 | 43 | 46 | 42 | 44 | 45 |
| Conversion of $NH_3$ to HCN, % vol | 25 | 35 | 36 | 38 | 36 | 39 | 42 | 39 | 39 | 39 |

These data show that the increase in conversion brought about by the addition of $CO_2$ to the reactor is about the same for both $NH_3$ and $CH_4$. At only 0.5% addition of $CO_2$, about 2% increase in conversion is obtained and at 2% almost 10% increase is obtained. The maximum degree of increase in conversion appears to be obtained at about 10% $CO_2$, beyond which the improvement in conversion seems to level off and perhaps even go down slightly. In any event, it does not seem to be warranted to use more than about 10% $CO_2$. Thus, a $CO_2$ addition range of 2 to 10% appears to be optimum.

In the previous examples, the effect of $CO_2$ addition was examined under essentially isothermal conditions. However, a further series of test runs was carried out under approximately adiabatic conditions. The experimental apparatus was the same as in the previous examples except for the preheater/reactor, which consisted of a 30-inch long alumina tube having an internal diameter of $\frac{3}{8}$ inch. The preheater section was enclosed within an electric heater by which a constant amount of heat could be added to the reactants before entering the reactor. The reactor section contained a 0.633 gram bed of Pt-Rh gauze sheets and was also enclosed within an electric heater. Both the preheater and reactor heater were insulated to reduce heat losses. Total reactant flow rate was about 4.5 liters per minute. The following runs were made at constant heat input from the electric heaters.

EXAMPLE V

A reactant mixture consisting of methane, air and ammonia in which the ratio of $CH_4$ to air was 0.22 and the ratio of $NH_3$ to air was 0.20 passed at a rate of 2000 cc/minute for about one hour through the test apparatus desceibed above. The catalyst temperature was about 1050° C. Analysis of the feed and product gases indicated the following:

Conversion of $CH_4$ to HCN: 62
Conversion of $NH_3$ to HCN: 48
Selectivity of $CH_4$ to HCN: 69
Selectivity of $NH_3$ to HCN: 64

EXAMPLE VI

The experiment of Example V was repeated under precisely the same adiabatic conditions except that 4.7% volume of the reactant mixture was replaced with $CO_2$ and $CO_2$ addition was continued for 5 hours before sampling. Analysis of the feed and product gases indicated the following:

Conversion of $CH_4$ to HCN: 67
Conversion of $NH_3$ to HCN: 49
Selectivity of $CH_4$ to HCN: 87
Selectivity of $NH_3$ to HCN: 64

Comparison of the data from this example with the data from Example V shows that under adiabatic reaction conditions, the conversion of $CH_4$ to HCN was increased by about 8% and conversion of $NH_3$ was increased by about 2%. Simultaneously, $CH_4$ selectivity rose by about 26% while $NH_3$ selectivity remained the same.

EXAMPLE VII

Using the same test conditions as in Example VI, except that the $CH_4$/Air ratio was reduced to 0.18 and the amount of $CO_2$ was raised slightly to 5% of the total feed, $CO_2$ addition was continued with the following results:

Conversion of $CH_4$ to HCN: 72
Conversion of $NH_3$ to HCN: 46
Selectivity of $CH_4$ to HCN: 92
Selectivity of $NH_3$ to HCN: 56

This slight change in operating conditions resulted in even higher conversion and selectivity of $CH_4$ and a slight loss in conversion and selectivity of $NH_3$.

After about 5 hours, the addition of $CO_2$ was discontinued. Yet 10 hours after the $CO_2$ was omitted, the effect was still evident in the analysis of the products, as follows:

Conversion of $CH_4$ to HCN: 72
Conversion of $NH_3$ to HCN: 53
Selectivity of $CH_4$ to HCN: 91
Selectivity of $NH_3$ to HCN: 71

EXAMPLE VIII

In this test, 0.750 gram of spent catalyst from a commercial HCN plant was substituted for testing under the same conditions as Example V except that $CH_4$/Air was 0.22 and $NH_3$/Air was 0.20. The test was run without $CO_2$ addition for 5 hours after which 5% $CO_2$ was substituted in the feed and the process was run continuously for an additional 10 hours with $CO_2$ addition. After the 10 hour period of $CO_2$ addition, $CO_2$ was removed from the feed and the products and reactants were analyzed. The results of this three-phase test are given in Table 3 which follows:

TABLE 3
EFFECT OF $CO_2$ ADDITION UPON CONVERSION,
Selectivity AND LEAKAGE OF REACTANTS

| Mode of Operation | Conversion to HCN | Selectivity | Leakage of Into Product Gases |
|---|---|---|---|
| Without $CO_2$ Additon | | | |
| $CH_4$ | 42 | 52 | 1.7% vol. |
| $NH_3$ | 30 | 44 | 4.1 |
| With $CO_2$ Addition | | | |
| $CH_4$ | 47 | 58 | 1.6 |
| $NH_3$ | 35 | 51 | 3.7 |
| Without $CO_2$ Addition Following 10-Hour Addition Period | | | |
| $CH_4$ | 53 | 61 | 1.2 |
| $NH_3$ | 38 | 50 | 3.1 |

These data show that the continuous addition of $CO_2$ to the reactant feed to the process resulted in over 11% improvement in $CH_4$ conversion and selectivity and about 16% improvement in $NH_3$ conversion and selectivity. Furthermore, $NH_3$ leakage was lowered by about 10%.

Of particular interest, however, were the results obtained after stopping $CO_2$ addition. In particular, the conversion of both $CH_4$ and $NH_3$ rose still further. Though $CH_4$ selectivity dropped back to substantially the same level as before $CO_2$ addition, $NH_3$ selectivity rose even further after $CO_2$ addition was stopped.

In each of the foregoing tests, it was observed that the beneficial effect of $CO_2$ addition is not obtained immediately, but only after the system has been in operation for several minutes. These last results, however, show that the beneficial effect of $CO_2$ addition is sustained for a long time after $CO_2$ addition has been terminated. This, of course, indicates that the process can advantageously be carried out in an intermittent fashion, e.g., by adding $CO_2$ for a period of at least several minutes and then cutting out $CO_2$ addition for a time while continuing operation of the process. Thus, when the desired level of conversion, selectivity and/or leakage are no longer obtained, $CO_2$ addition can be resumed. It is preferred that each increment of $CO_2$ addition be for a period of at least 0.5 hour and preferably 5 hours or longer. The above data indicate that a cycle of 5 hours with $CO_2$ addition and 10 hours without $CO_2$ addition may be sufficient. It would seem likely, however, that the precise length of the cycles for intermittent operation are quite subjective to the particular catalyst and can best be determined by routine experimentation with that catalyst.

Despite the extensive amount of experimental work that was done using $CO_2$ as a supplemental feed, it is still not clear in what way the $CO_2$ may be functioning. It is possible that undetectably small amounts of $CO_2$ may be reacting with carbon which has been deposited on the surface of the catalyst to form CO which is removed in the product gases. However, photomicrographs of gauze catalysts at 50–1000× magnification indicate that the physical character of the catalyst undergoes change as a result of $CO_2$ addition. In particular, the surface of the treated catalyst appears when viewed at 50× to be more porous and, when viewed at 200× and higher, appears to be more highly crystalline. Thus, a direct interaction with the catalyst itself cannot be ruled out.

I claim:

1. A process for increasing the yield of HCN in an Andrussow-type process for the synthesis of HCN by the vapor-phase reaction of methane with ammonia and oxygen in the presence of a noble metal oxidation catalyst, which comprises: feeding a mixture of reactant gases over the entire catalyst surface, said reactant gas mixture having a volume ratio of methane to oxygen in the range of about 0.9–1.5 and containing about 0.5–20% by volume of $CO_2$, whereby the conversion of $CH_4$ to HCN is increased by at least about 6% by volume.

2. The process of claim 1 in which the methane to $O_2$ ratio is from about 1.0 to about 1.3 and the reactant feed contains from about 2 to about 10% by volume $CO_2$, whereby the conversion of $CH_4$ to HCN is increased by at least about 6 percentage points by volume.

3. The process of claim 1 in which the catalyst is an alloy of platinum and rhodium.

4. The process of claim 1 in which the addition of $CO_2$ to the reactant feed is carried out intermittently.

5. The process of claim 1 in which the addition of $CO_2$ to the reactant feed is carried out for at least 0.5 hour.

* * * * *